United States Patent
Dudar et al.

(10) Patent No.: US 11,964,554 B2
(45) Date of Patent: Apr. 23, 2024

(54) METHODS AND SYSTEMS FOR FUEL SYSTEM

(71) Applicant: Ford Global Technologies, LLC, Dearborn, MI (US)

(72) Inventors: Aed Dudar, Canton, MI (US); Scott Bohr, Novi, MI (US); Matthew Werner, Kenockee Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 17/653,108

(22) Filed: Mar. 1, 2022

(65) Prior Publication Data
US 2023/0278419 A1    Sep. 7, 2023

(51) Int. Cl.
*B60K 15/035*    (2006.01)

(52) U.S. Cl.
CPC .......... *B60K 15/03519* (2013.01); *B60K 2015/03576* (2013.01)

(58) Field of Classification Search
CPC ........... B60K 15/03519; B60K 2015/03576
See application file for complete search history.

(56) References Cited

U.S. PATENT DOCUMENTS

| | | | | |
|---|---|---|---|---|
| 4,790,283 A * | 12/1988 | Uranishi | .......... | B60K 15/03519 123/519 |
| 4,815,436 A * | 3/1989 | Sasaki | ............. | B60K 15/03504 137/51 |
| 10,830,189 B1 | 11/2020 | Dudar | | |
| 11,104,222 B2 | 8/2021 | Dudar | | |
| 2008/0283127 A1* | 11/2008 | Wang | ............... | B60K 15/03519 137/313 |
| 2013/0032127 A1* | 2/2013 | Jentz | .................. | F02M 25/0809 123/520 |
| 2017/0130659 A1* | 5/2017 | Dudar | ................ | F02M 25/0836 |
| 2017/0260932 A1* | 9/2017 | Brock | ............. | B60K 15/03519 |
| 2018/0274490 A1* | 9/2018 | Honjo | ................ | F02M 25/0854 |

FOREIGN PATENT DOCUMENTS

DE    112007001362 T5    7/2009

* cited by examiner

*Primary Examiner* — Patrick C Williams
(74) *Attorney, Agent, or Firm* — Vincent Mastrogiacomo; McCoy Russell LLP

(57) ABSTRACT

Methods and systems are provided for an evaporative emission fuel (EVAP) system. In one example, a method for the EVAP system includes loading canisters in parallel sequentially during a refueling event. The method further includes switching loading from one canister to another in response to a fuel level during the refueling event.

18 Claims, 7 Drawing Sheets

METHODS AND SYSTEMS FOR FUEL SYSTEM

FIELD

The present description relates generally to methods and systems for a fuel system comprising parallel vapor canisters.

BACKGROUND/SUMMARY

Vehicle emission control systems may be configured to store vapors from a fuel tank refueling and diurnal engine operations in a vapor canister. The stored vapors may be purged during a later engine operating condition. The stored vapors may be routed to an engine intake for combustion, which may improve fuel economy.

An amount of vapors stored onboard the vehicle may be proportional to a fuel tank size. As the fuel tank increases, a size of the canister may be increased to store a greater amount of vapors. However, larger canisters may increase a restriction in the vapor line, which may shut-off a fuel pump before 100% fuel level index is reached. To address this issue, some systems with larger fuel tanks may use at least two vapor canisters.

However, the inventors have identified some issues with the approaches described above. For example, including two vapor canisters may still be prone to the same issues single canister systems face during refueling. For example, canisters may include a natural variability in their restriction or one canister may develop a greater restriction over time due to being purged more, degradation of a carbon bed due to vibrations, and the like. If one canister is more restrictive than the other, then vapor flow favors the less restrictive canister. During some refueling events, the less restrictive canister may overload and spew vapors to the atmosphere, thereby increasing emissions. Thus, a method for balancing loading of parallel vapor canisters is desired.

In one example, the issues described above may be addressed by a method for an evaporative emission control (EVAP) system including determining a load of a first canister and a second canister, flowing vapors to a less loaded of the first canister and the second canister during a refueling event, and switching vapor flow to the other canister in response to a fuel level of a fuel tank during the refueling event. In this way, overfilling of a canister may be avoided and emissions may be reduced.

As one example, if both the first canister and the second canister are clean, then vapor flows to only the first canister or the second canister. Once the fuel level of the fuel tank is equal to a threshold lever, the vapor flow switches to the other canister. This may mitigate overloading of a single canister due to the issues described above. The canisters may be balanced after the refueling event by sealing the canisters from the fuel tank and opening both to a common vent line. By doing this, vapor escape to the atmosphere is mitigated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
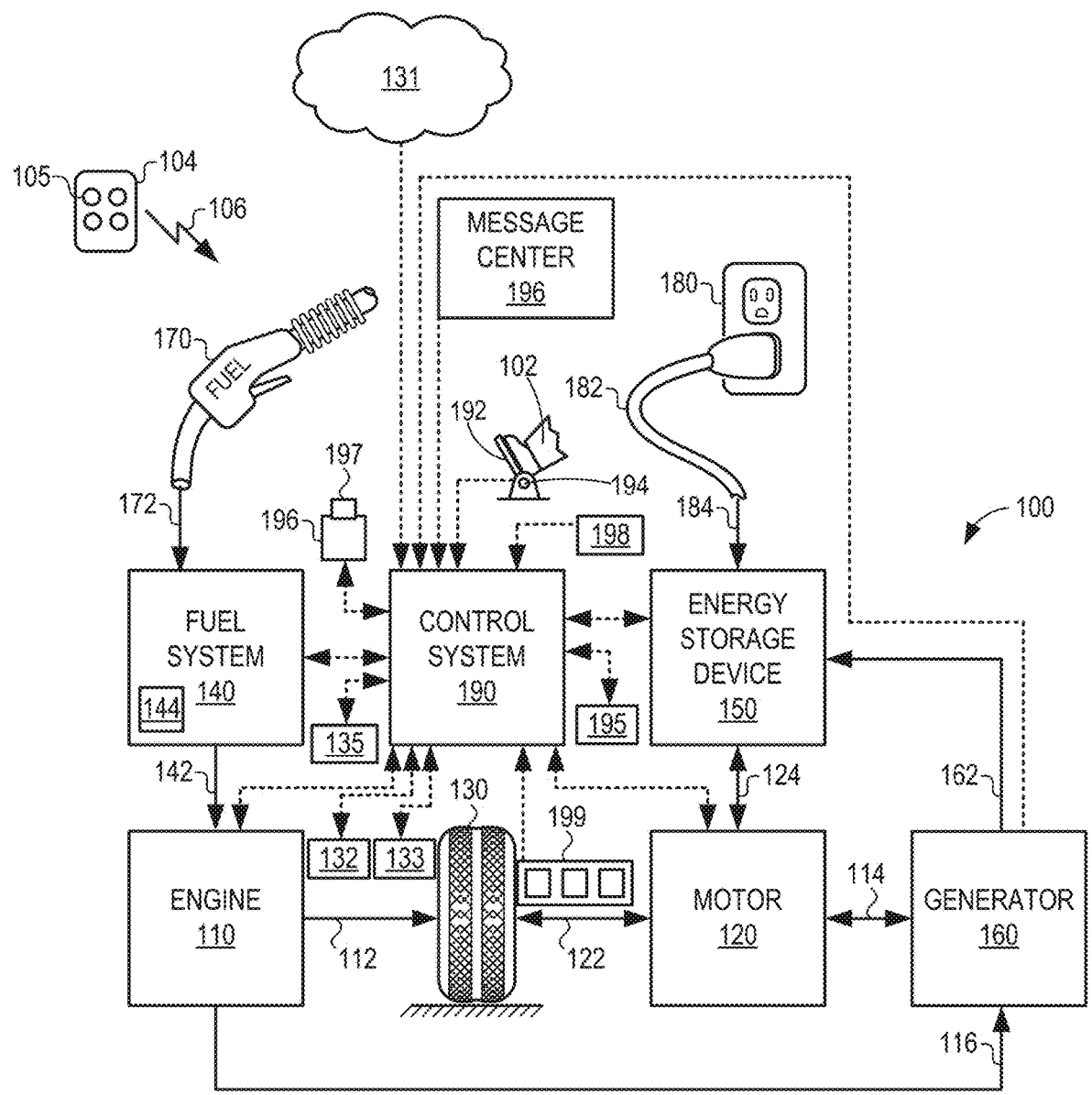
FIG. 1 illustrates a schematic of an engine included in a hybrid vehicle.
Figure 2:
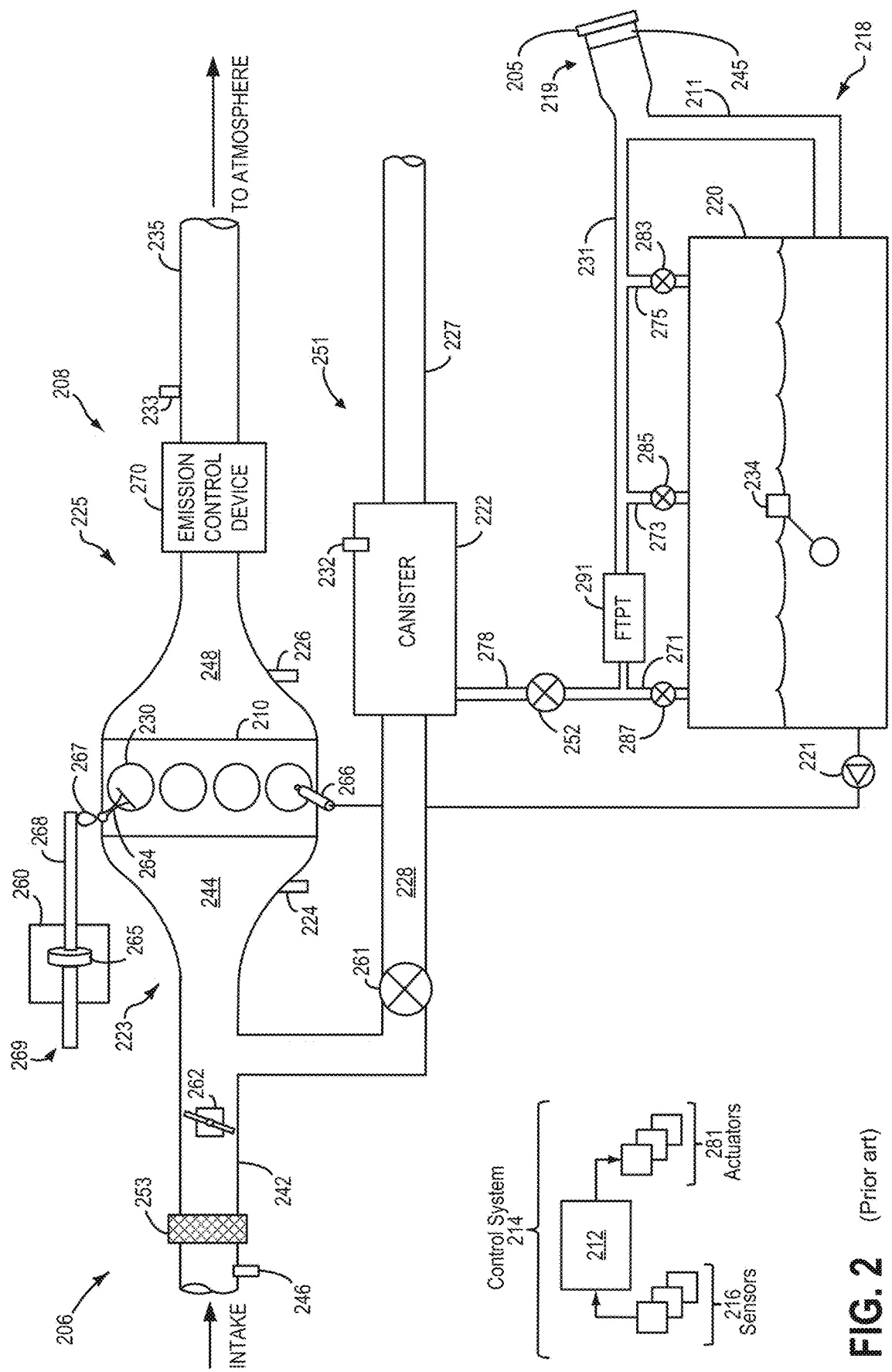
FIG. 2. illustrates a prior art example of an engine including a single canister.
Figure 3:
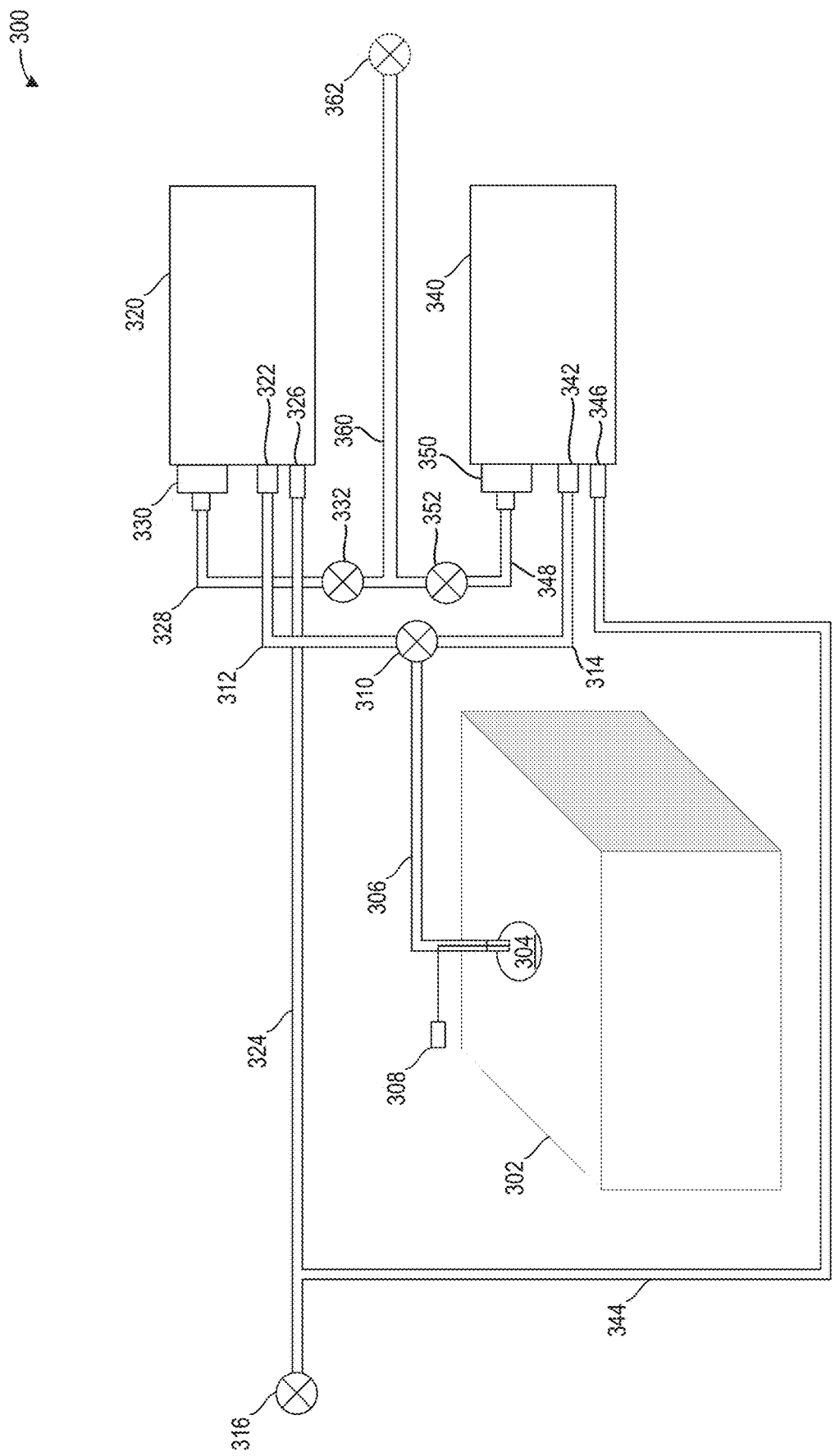
FIG. 3 illustrates the engine including canisters arranged in parallel.
Figure 4:
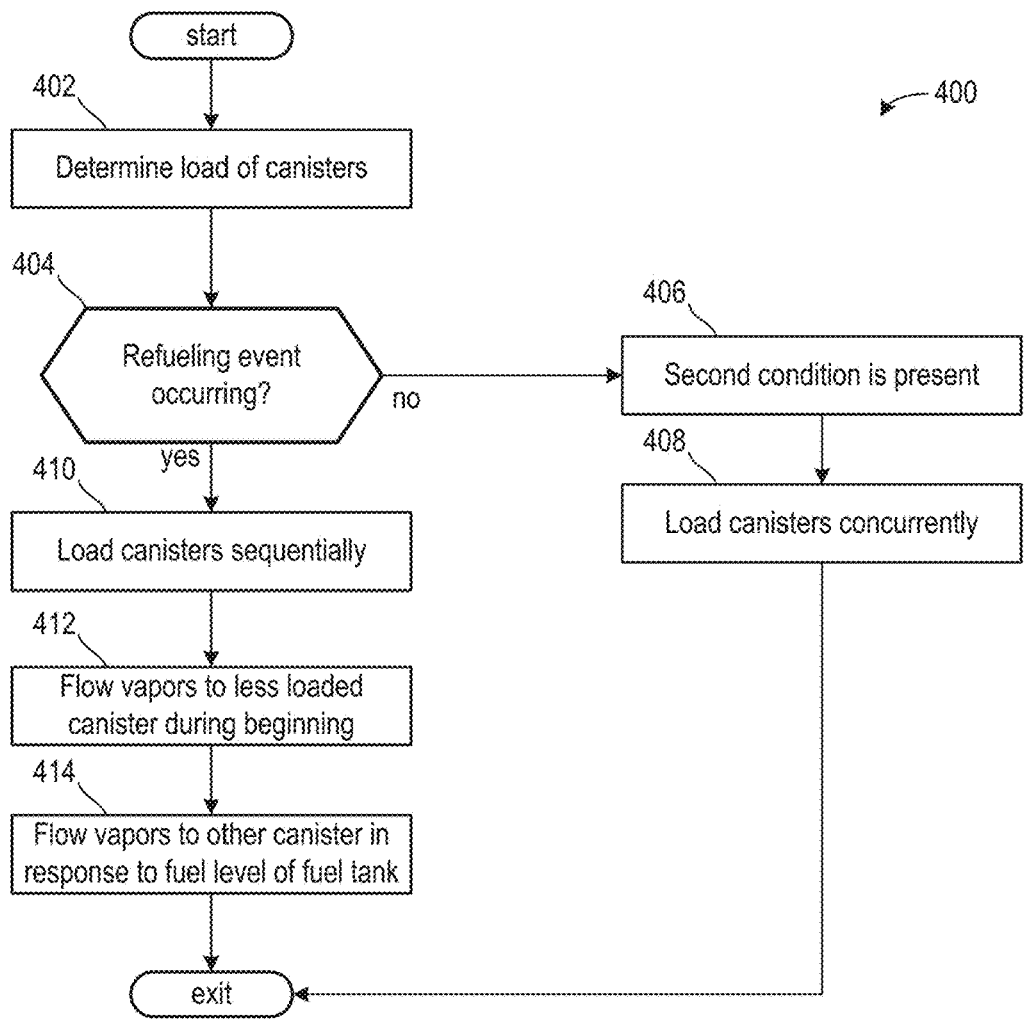
FIG. 4 illustrates a high-level flow chart for flowing vapors to the canisters.
Figure 5:
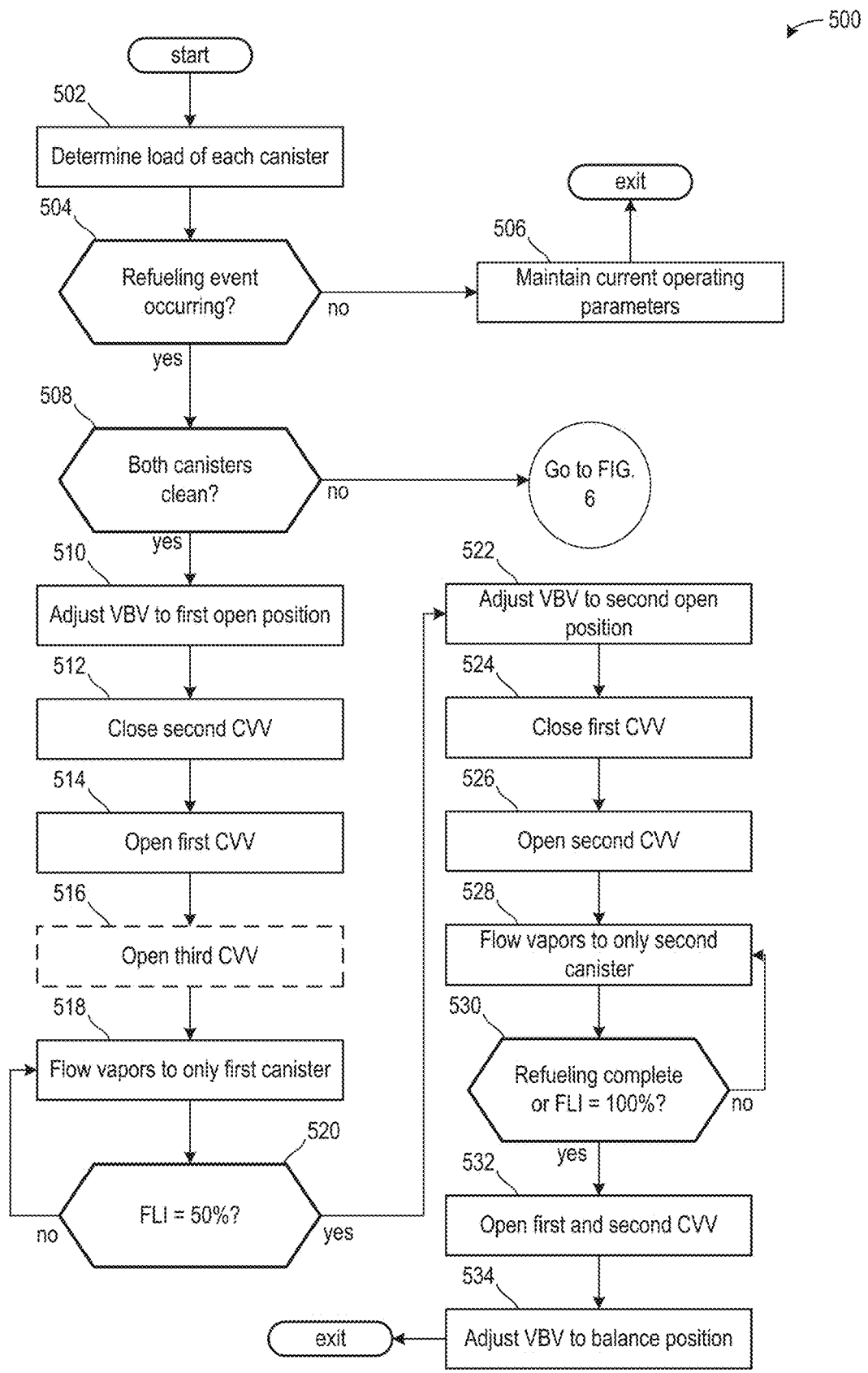
FIGS. 5 and 6 illustrate methods for flowing vapors to the canisters during a refueling event.
Figure 6:
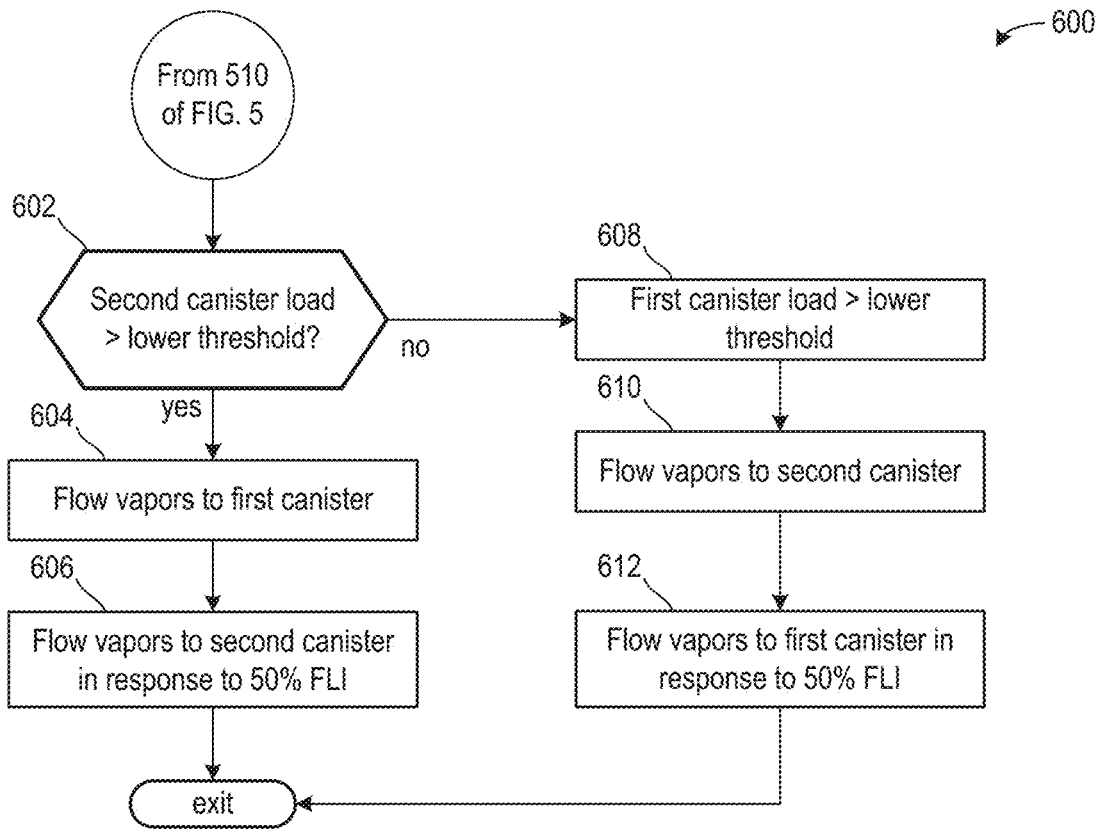
Figure 7:
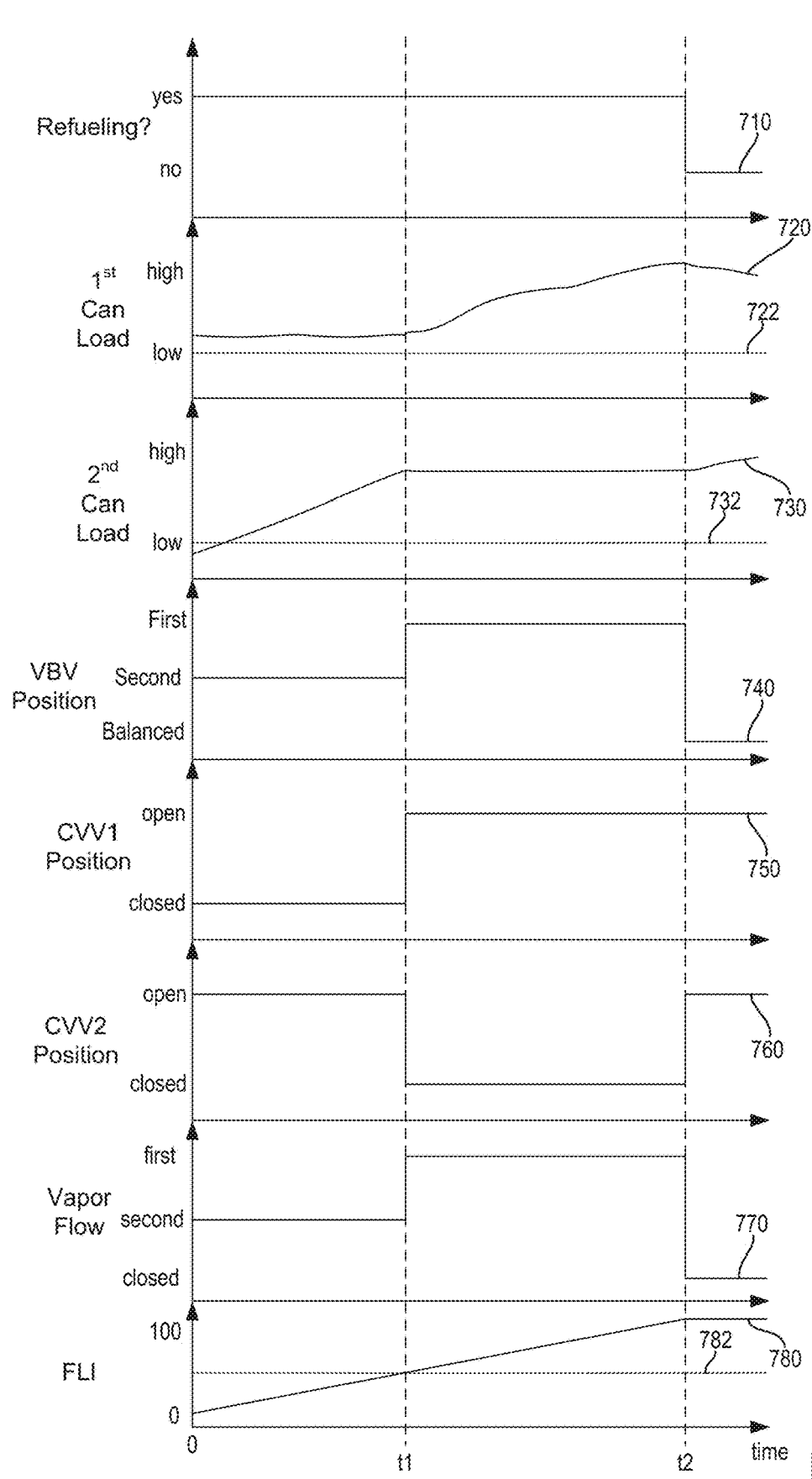
FIG. 7 graphically illustrates an engine operating sequence illustrating changes in vapor flow during a refueling event.

The following description relates to systems and methods for flowing vapors to parallel canisters of an evaporative emission control (EVAP) system. FIG. 1 illustrates a schematic of an engine included in a hybrid vehicle. FIG. 2. illustrates a prior art example of an engine including a single canister. FIG. 3 illustrates the engine including canisters arranged in parallel. FIG. 4 illustrates a high-level flow chart for flowing vapors to the canisters. FIGS. 5 and 6 illustrate methods for flowing vapors to the canisters during a refueling event. FIG. 7 graphically illustrates an engine operating sequence illustrating changes in vapor flow during a refueling event.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be automatically actuated or pressed by a vehicle operator to initiate refueling. For example, in response to the vehicle operator actuating refueling button 197, a fuel tank in the vehicle may be depressurized so that refueling may be performed.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example.

Vehicle system 100 may also include an on-board navigation system 132 (for example, a Global Positioning System) with which an operator of the vehicle may interact. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In some examples, vehicle system 100 may include lasers, radar, sonar, acoustic sensors 133, which may enable vehicle location, traffic information, etc., to be collected via the vehicle.

The vehicle system 100 may be in wireless communication with a wireless network 131. The control system 190 may communicate with the wireless network 131 via a modem, a router, a radio signal, or the like. Data regarding various vehicle system conditions may be communicated between the control system 190 and the wireless network. Additionally or alternatively, the wireless network 131 may communicate conditions of other vehicles to the control system 190.

FIG. 2 shows a schematic depiction of a prior art example of a vehicle system 206. The vehicle system 206 includes an engine system 208 coupled to an evaporative emissions control system 251 and a fuel system 218. Evaporative emissions control system 251 (also termed, evaporative emissions system 251) includes a fuel vapor container or fuel system canister 222 which may be used to capture and store fuel vapors. In some examples, vehicle system 206 may be a hybrid electric vehicle system, such as the vehicle propulsion system 100 of FIG. 1. As such, engine 210 may be similar to engine 110 of FIG. 1 while control system 214 of FIG. 2 may be the same as control system 190 of FIG. 1.

The engine system 208 may include an engine 210 having a plurality of cylinders 230. The engine 210 includes an engine intake 223 and an engine exhaust 225. The engine intake 223 includes a throttle 262 fluidly coupled to the intake manifold 244. Fresh intake air enters intake passage 242 and flows through air filter 253. Air filter 253 positioned in the intake passage 242 may clean intake air before the intake air is directed to the intake manifold 244. Cleaned intake air exiting the air filter 253 may stream past throttle 262 (also termed intake throttle 262) into intake manifold 244 via intake passage 242. As such, intake throttle 262 when fully opened may enable a higher level of fluidic communication between intake manifold 244 and intake passage 242 downstream of air filter 253. An amount of intake air provided to the intake manifold 244 may be regulated via throttle 262 based on engine conditions. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NO trap, diesel particulate filter, oxidation catalyst, etc. It will be appreciated that other components may be included in the engine such as a variety of valves and sensors.

Each cylinder 230 may be serviced by one or more valves. In the present example, each cylinder 30 includes a corresponding intake valve 264 and an exhaust valve (not shown). Each intake valve 264 may be held at a desired position via a corresponding spring. Engine system 208 further includes one or more camshafts 268 for operating intake valve 262. In the depicted example, intake camshaft 268 is coupled to intake valve 264 and can be actuated to operate intake valve 264. In some embodiments, where the intake valve of a plurality of cylinders 230 are coupled to a common camshaft, intake camshaft 268 can be actuated to operate all the intake valves of all the coupled cylinders.

Intake valve 264 is actuatable between an open position that allows intake air into the corresponding cylinder and a closed position substantially blocking intake air from the cylinder. Intake camshaft 268 may be included in intake valve actuation system 269. Intake camshaft 268 includes intake cam 267 which has a cam lobe profile for opening intake valve 264 for a defined intake duration. The lobe profile may affect cam lift height, cam duration, and/or cam timing. A controller, such as controller 212, may be able to switch the intake valve duration by moving intake camshaft 268 longitudinally and switching between cam profiles.

It will be appreciated that the intake and/or exhaust camshafts may be coupled to cylinder subsets, and multiple intake and/or exhaust camshafts may be present. Intake valve actuation system 269 may further include push rods, rocker arms, tappets, etc. As such, the intake valve actuation system may include a plurality of electromechanical actuators. Such devices and features may control actuation of the intake valve 264 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 230 may each have more than one intake valve. In still other examples, each intake valve 264 of one or more cylinders may be actuated by a common camshaft. Further still, in some examples, some of the intake valves 264 may be actuated by their own independent camshaft or other device.

Engine system 208 may include variable valve timing systems, for example, variable cam timing VCT system 260. As such, VCT system 260 may be operatively and communicatively coupled to the intake valve actuation system 269. VCT system 260 may include an intake camshaft phaser 265 coupled to the common intake camshaft 268 for changing intake valve timing. VCT system 260 may be configured to advance or retard valve timing by advancing or retarding cam timing and may be controlled by controller 212. In some embodiments, valve timing such as intake valve closing (IVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 260. As such, the valve actuation systems described above may enable closing the intake valves to block fluid flow therethrough, when desired.

Though not shown in FIG. 2, vehicle system 206 may also include an exhaust gas recirculation (EGR) system for routing a desired portion of exhaust gas from the exhaust passage 235 to the intake manifold 244 via an EGR passage. The amount of EGR provided may be varied by controller 212 via adjusting an EGR valve in the EGR passage. By introducing exhaust gas to the engine 210, the amount of available oxygen for combustion is decreased, thereby reducing combustion flame temperatures and reducing the formation of $NO_x$, for example.

Fuel system 218 may include a fuel tank 220 coupled to a fuel pump system 221. The fuel pump system 221 may include one or more pumps for pressurizing fuel delivered to the injectors of engine 210, such as the example injector 266. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to evaporative emissions control system 251, which includes a fuel vapor canister 222, via vapor recovery line 231. The fuel vapor canister 222 may also be simply termed canister 222 herein. Fuel vapors stored in fuel vapor canister 222 may be purged to the engine intake 223 at a later time. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219 (or refueling system 219). In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Evaporative emissions control system 251 may include one or more emissions control devices, such as one or more fuel vapor canisters 222 (also termed, canister 222) filled with an appropriate adsorbent. The canisters are configured to temporarily trap fuel vapors (including vaporized hydrocarbons) during fuel tank refilling operations and "running loss" (that is, fuel vaporized during vehicle operation). In one example, the adsorbent used is activated charcoal. Evaporative emissions system 251 may further include a canister ventilation path or vent line 227 which may route gases out of the canister 222 to the atmosphere when storing, or trapping, fuel vapors from fuel system 218.

Vent line 227 may allow fresh air to be drawn into canister 222 when purging stored fuel vapors from canister 222 to engine intake 223 via purge line 228 and canister purge valve 261 (also termed, purge valve 261). For example, purge valve 261 may be normally closed but may be opened during certain conditions so that vacuum from engine intake manifold 244 is provided to the fuel vapor canister 222 for purging.

FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may be stored within canister 222 and air, stripped off fuel vapors, may then be vented to atmosphere via vent line 227. Fuel vapors stored in fuel vapor canister 222 may be purged along purge line 228 to engine intake 223 via canister purge valve 261 at a later time when purging conditions exist. As such, FTIV 252 when closed may isolate and seal the fuel tank 220 from the evaporative emissions system 251. It will be noted that certain vehicle systems may not include FTIV 252.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open FTIV 252 while closing canister purge valve (CPV) 261 to direct refueling vapors into canister 222 and preventing fuel vapors from being directed into the intake manifold.

As another example, the fuel system may be operated in a refueling mode (e.g., when fuel tank refueling is requested by a vehicle operator), wherein the controller 212 may open FTIV 252, while maintaining CPV 261 closed, to depressurize the fuel tank before allowing fuel to be added therein. As such, FTIV 252 may be kept open during the refueling operation to allow refueling vapors to be stored in the canister. After refueling is completed, the FTIV may be closed.

As yet another example, the fuel system may be operated in a canister purging mode (e.g., after an emission control device light-off temperature has been attained and with the engine running), wherein the controller 212 may open CPV 261 while closing FTIV 252. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. The FTIV 252 may be closed during the purging mode.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include manifold absolute pressure (MAP) sensor 224, barometric pressure (BP) sensor 246, exhaust gas sensor 226 located in exhaust manifold 248 upstream of the emission control device, temperature sensor 233, fuel tank pressure sensor 291 (also termed a fuel tank pressure transducer or FTPT), and canister temperature sensor 232. Other sensors such as pressure, temperature, air/fuel ratio, and composition sensors may be coupled to various locations in the vehicle system 206. As another example, the actuators may include CPV 261, fuel injector 266, throttle 262, FTIV 252, fuel pump 221, and refueling lock 245. The control system 214 may include a controller 212. The controller may receive input data from the various sensors, process the input data, and trigger the actuators in response to the processed input data based on instruction or code programmed therein corresponding to one or more routines.

The controller 212 receives signals from the various sensors of FIG. 2 and employs the various actuators of FIG. 2 to adjust engine operation based on the received signals and instructions stored on a memory of the controller. For example, adjusting the canister purge valve may include adjusting an actuator of the canister purge valve to adjust a flow rate of fuel vapors therethrough. As such, controller 212 may communicate a signal to the actuator (e.g., canister purge valve solenoid) of the canister purge valve based on a desired purge flow rate. Accordingly, the canister purge valve solenoid may be opened (and pulsed) at a specific duty cycle to enable a flow of stored vapors from canister 222 to intake manifold 244 via purge line 228.

Turning now to FIG. 3, it shows an embodiment of a fuel system 300. The fuel system 300 may be used in the engine system of FIGS. 1 and/or 2. The fuel system 300 may include a fuel tank 302 configured to store one or more fuels. In one example, the fuel tank 302 may be similar to the fuel tank 220 of FIG. 2. The fuel tank 302 may include a port 304 to which a load line 306 is fluidly coupled. The load line 306 may be configured to flow fuel vapors to and/or from the fuel tank 302. A FTPT 308 may be coupled to the fuel tank 302 at a location proximal to the load line 306.

Unlike the example of FIG. 2, which includes only a single canister coupled to a load line (e.g., conduit 278), the fuel system 300 includes a first canister 320 and a second canister 340 coupled to the load line 306. In one example, the fuel system 300 is similar to the fuel system 218 of FIG. 2 except that the fuel system 300 includes at least two canisters and the fuel system 218 includes only one canister. In this way, the first and second canister 320, 340 may replace the single canister of FIG. 2 in the vehicle system 206.

A variable bleed valve (VBV) 310 may be arranged along the load line 306. The VBV 310 may be coupled to a first canister load line 312 and a second canister load line 314. The first canister load line 312 may be coupled to the VBV 310 and a first canister inlet port 322 and flow. The second canister load line 314 may be coupled to the VBV 310 and a second canister inlet port 342.

The VBV 310 may include a plurality of positions including a first open position, a second open position, and a closed position (herein, interchangeably referred to as a balance position). The first open position may flow vapors from the fuel tank 302 to only the first canister 320. The second open position may flow vapors from the fuel tank 302 to only the second canister 340. The closed position may close the load line 306 from each of the first canister 320 and the second canister 340. In one example, the VBV 310 is a three-way valve. The VBV 310 may include an actuator configured to receive signals from a controller (e.g., controller 212 of FIG. 2). Instructions stored on memory of the controller may cause the controller to adjust a position of the VBV 310 based on a loading of the first canister 320, the second canister 340, or both or in response to a fuel level.

Each of the first canister 320 and the second canister 340 may be coupled to a CPV 316. In one example, the CPV 316 may be identical to CPV 261 of FIG. 2. The CPV 316 may direct vapors to an engine intake during conditions, such as when combustion is occurring and fuel is being consumed. The first canister 320 may comprise a first canister purge line 324 and the second canister 340 may comprise a second canister purge line 344. The first canister purge line 324 may be coupled to the first canister 320 at a first canister purge port 326. The second canister purge line 344 may be coupled to the second canister 340 at a second canister purge port 346. The first canister purge line 324 and the second canister purge line 344 may intersect upstream of the CPV 316 relative to a direction of vapor flow.

Each of the first canister 320 and the second canister 340 may further include corresponding vent lines. The first canister 320 may include a first canister vent line 328 coupled to a first canister vent port 330 and a first canister vent valve (CVV) 332. The second canister 340 may include a second canister vent line 348 coupled to a second canister vent port 350 and a second CVV 352. The first and second vent lines may merge to form a common vent line 360. A third CVV 362 may be arranged in the common vent line 360. In some examples, the third CVV 362 may be omitted in some examples.

In one example, when the VBV 310 is in the closed position and balancing is desired, the first and second CVVs may be open and the third CVV 362 may be closed. Vapors may enter the common vent line 360 and return to the first and second canisters, wherein distribution of the vapors may balance a loading of the first and second canisters.

As will be described in greater detail below, the fuel system 300 may be operated to balance a loading of the first canister 320 and the second canister 340 during a refueling event. In one example, a method may include loading the less loaded of the first and second canisters during a beginning of the refueling event and loading the other of the first and second canisters in response to a fuel level of the fuel tank during the refueling event.

In one example, a length and a diameter of the lines to and from the canisters may be substantially identical. That is to say, a length and a diameter of the first load line 312 and the second load line 314 may be identical. A length and a diameter of the first canister purge line 324 and the second canister purge line 344 may be identical. A length and a diameter of the first canister vent line 328 and the second canister vent line 348 may be identical. A size and a volume, including carbon bed, of the first canister 320 and the second canister 340 may be identical. By doing this, restrictions of the canisters may be substantially identical, thereby promoting more even vapor flow.

Turning now to FIG. 4, it shows a high-level flow chart 400 illustrating a method for adjusting vapor flow to parallel canisters during a refueling event. Instructions for carrying out method 400 and the rest of the methods included herein may be executed by a controller based on instructions stored on a memory of the controller and in conjunction with signals received from sensors of the engine system, such as the sensors described above with reference to FIGS. 1-3. The controller may employ engine actuators of the engine system to adjust engine operation, according to the methods described below.

The method 400 begins at 402, which includes determining a load of the first canister and the second canister. Determining the load of the first canister may include actuating the first CVV to an open position, actuating the second CVV to a closed position, and actuating the VBV to the first open position. The FTPT may sense a pressure of the first canister, which may correlate to a load of the first canister. If the pressure is relatively high, then the load of the first canister may be relatively high. Determining the load of the second canister may include actuating the second CVV to an open position, actuating the first CVV to a closed position, and actuating the VBV to the second open position. The FTPT may sense a pressure of the second canister, which may correlate to a load of the second canister.

As another example, a load of the first canister and the second canister may be determined via an oxygen sensor. If the oxygen sensor senses rich, then the canister may be loaded, wherein a magnitude of the loading may be proportional to an $O_2$ rich shift magnitude. For example, the richer the gas sensed by the oxygen sensor, then the canister may be more loaded. If the oxygen sensor senses lean, then the canister may be clean (e.g., unloaded).

At 404, the method 400 may include determining if a first condition is present. In one example, the first condition is present if a refueling event is occurring. The controller may determine a refueling event is occurring based on a fuel level index (FLI) increasing, a vehicle location, and a refueling door position. For example, the FLI may be determined by the controller based on feedback from a fuel level sensor. If the FLI is increasing, then a refueling event may be occurring. The vehicle location may be determined based on feedback from a geolocating device, such as a navigation system, a GPS sensor, a mobile device, or the like. If the vehicle location corresponds to a refueling station, then a refueling event may be occurring. Additionally or alternatively, if the fueling door position is in an open position, then a refueling event may be occurring.

If the first condition is not present, then the method 400 may proceed to 406, which includes where a second condition is present. The second condition may correspond to a non-refueling event.

At 408, the method 400 may include loading the canisters concurrently. Loading the canisters concurrently may include balancing vapor flow to each of the first and second canister by fluidly coupling both to the common vent line. In one example, the VBV may be in an open position and the first and second CCVs may be open to allow vapors to balance between the first and second canisters.

If a refueling event is occurring and the first condition is present, then at 410, the method 400 may include loading the canisters sequentially. As such, vapors may flow to only one of the canisters, and then flow to the other canisters following a determination of a fuel level in a fuel tank.

At 412, the method 400 may include flowing vapors to a less loaded canister of the canisters. If both canisters are equally loaded at a beginning of the first condition, then one of the canisters may be selected randomly. Alternatively, canister loading at the beginning of the first condition may be tracked and the canister loading may alternate relative to a previous loading. For example, if the first canister was loaded during the beginning of a previous refueling event when both canisters were clean to start the refueling event, then the second canister may be loaded during the beginning during the beginning of a current refueling event.

At 414, the method 400 may include flowing vapors to the other canister in response to a fuel level of a fuel tank. Said another way, the vapors are directed to the canister that was not loaded prior to the fuel level reaching a threshold level. In one example, the threshold level is equal to 50% of a full fuel tank. Additionally or alternatively, the threshold level may be equal to half a difference between a starting fuel level at a start of the refueling event and a 100% fuel level (e.g., a full fuel tank). By doing this, vapor escape to atmosphere may be mitigated, which may decrease emissions. Additionally or alternatively, filling of a loaded canister may be avoided by loading the canister for less than an entirety of a refueling event.

In one example, each canister may include an amount of carbon bed margin such that an entire refueling event may load a percentage of an entire canister, wherein the percentage is less than 100%. For example, canisters may include a 20% carbon bed margin such that a 100% refueling event from empty to full may load the canister to 80%. However, the margin may decrease as the canister ages, which may result in vapors being released to the atmosphere during a refueling event in conjunction with a fuel system of the prior art of FIG. 2. However, by executing the method 400 with the fuel system of FIG. 3 including the parallel canisters along with the three-way VBV, loading of the canisters may be balanced such that a load of the canisters may be relatively equal upon conclusion of the refueling event and entering a third condition. In one example, the third condition follows the first condition and precedes the second condition. A duration of the third condition may be empirically determined and equal to a fixed value. Additionally or alternatively, a duration of the third This may decrease vapor flow to the atmosphere during refueling while also increasing a remaining-useful-life (RUL) of the canisters.

Turning now to FIGS. 5 and 6, the show methods 500 and 600, respectively, for adjusting a position of the VBV based on loads of the first and second canisters at a beginning of a refueling event.

At 502, the method 500 includes determining a load of the first canister and the second canister, described above at 402 of method 400.

At 504, the method 500 may include determining if a refueling event is occurring, described above at 404 of method 400. As such, the loads are determined prior to the refueling event. If the refueling event is not occurring, then at 506, the method 500 may include maintaining current operating parameters. In one example, the VBV is maintained in a closed position or open to one of the canisters and the first CCV and the second CCV are maintained in open positions.

If the refueling event is occurring, then at 508, the method 500 may include determining if both canisters are clean. In one example, a canister may be clean if a load thereof is less than a threshold load. The threshold load may be based on a non-zero, positive number, such as 5% or less of a full load (e.g., 100% load) of the canister. Both canisters may be clean if vapor pressures thereof are relatively low, sensed by the FTPT, or if vapors thereof are lean, sensed by an oxygen sensor.

If both canisters are clean, then at 510, the method 500 may include adjusting the VBV to the first open position. The controller may signal to an actuator of the VBV to move from the closed position to the first open position.

At 512, the method 500 may include adjusting the second CVV to a closed position. The controller may signal to an actuator of the second CVV to move from the open position to the closed position.

At 514, the method 500 may include adjusting the first CVV to an open position. The controller may signal to an actuator of the first CVV to maintain an open position. Additionally or alternatively, the method 500 may include opening the first CVV if the CVV position was a closed position.

At 516, the method 500 may optionally include adjusting the third CVV to an open position.

At 518, the method 500 may include flowing vapors to only the first canister during the refueling. As such, vapors from the fuel tank may flow through the load line, through the VBV in the first open position, to the first canister load line, and into the first canister. As such, vapors may not flow into the second canister when the VBV is in the first open position.

At 520 the method 500 may include determining if the FLI is equal to 50%. If the FLI is not equal to 50%, then the vapors continue to flow to only the first canister. In some examples, the 50% fuel level in the fuel tank may be adjusted. For example, the fuel level at which canister loading may switch may be equal to a half a difference between a fuel level at a start of the refueling event and a 100% fuel level. Other values may also be used.

If the FLI is equal to 50%, then at 522 the method 500 may include adjusting the VBV to the second open position. Thus, the method may include switching a direction of vapor flow from the first canister to the second canister in response to only the fuel level of the fuel tank. The switching does not occur in response to a load of either canister and loads of the canisters are not estimated during the refueling event.

At 524, the method 500 may include closing the first CVV.

At 526, the method 500 may include opening the second CVV.

At 528, the method 500 may include flowing vapors to only the second canister. As such, vapors may flow from the fuel tank, through the load line, through the VBV in the second open position, through the second canister load line, and into the second canister. As such, vapors may not flow into the first canister when the VBV is in the second open position.

At 530, the method 500 may include determining if the refueling is complete or if the FLI is equal to 100%. The refueling may be complete prior to the FLI being equal to 100% if the vehicle operator requested less than a fuel-tank fill-up (e.g., less than 100% FLI). The refueling may be complete once a fuel nozzle is removed from a fuel filler neck, a refueling lock is locked, and/or a fuel cap is closed.

If refueling is not complete, then the method 500 may continue to flow vapors to only the second canister. If refueling is complete, then at 532, the method 500 may include opening the first and second CVVs.

At 534, the method 500 may include adjusting the VBV to the closed position. Vapors from the first and second canisters may flow to the purge line and back into the canisters, wherein returning the vapors to the canisters may result in a balancing of the loads of the first and second canisters. By closing the VBV, undesired backflow through the load lines may be avoided.

Returning to 508, if both canisters are not clean, then the method 500 may proceed to 602 of method 600, which includes determining if the second canister load is greater than a lower threshold load. In one example, the lower threshold is based on a partial loading of the canister. In one example, the lower threshold may be equal to between 5-50% of a total canister loading. In one example, the lower threshold load is equal to value between 20 to 30%.

If the second canister load is greater than the lower threshold load, then at 604, the method 600 may include flowing vapors to only the first canister during a beginning of the refueling event. Flowing vapors to only the first canister may include actuating the VBV to the first open position, actuating the first CVV to the open position, and actuating the second CVV to the closed position, as described above with respect to steps 510-518 of method 500.

At 606, the method 600 may include flowing vapors to the second canister in response to the FLI being equal to 50%. As such, the canister receiving fuel vapors may switch at 50% FLI without sensing a load of any of the canisters.

Returning to 602, if the second canister load is not greater than the lower threshold load, then at 608, the method 600 includes where the first canister load is greater than the lower threshold load.

At 610, the method 600 includes flowing vapors to only the second canister during a beginning of the refueling event.

At 612, the method 600 includes flowing vapors to the first canister in response to the FLI being equal to 50%.

By distributing vapors during the refueling event based on the methods 500 and 600, neither canister may receive more than half the vapors of the refueling event. This may mitigate vapor escape to the atmosphere during the refueling event. The methods may balance the canisters following the refueling event by allowing vapors to freely flow therebetween and redistribute based on restrictions and loads of the canisters, such that loads of the canisters following the refueling event are substantially equal.

Thus, in one example, methods 500 and 600 of FIGS. 5 and 6, respectively, illustrate methods for loading a less loaded canister during a beginning of a refueling event. The method may then switch loading to a different canister during a later portion of the refueling event in response to a fuel level of a fuel tank. The initial portion may correspond to a first half of the refueling event. A total length of the refueling event may be equal to a difference between a current fuel level and a fill-up fuel level (e.g., 100% FLI). Additionally or alternatively, the total length may be based on a requested amount of fueling. Some refueling event may include where a current FLI is not increased to the fill-up fuel level. As such, the total length may be equal to a requested amount of fuel, wherein the requested amount of fuel may be calculated based on a cost of fuel and an amount tendered for refueling. Each canister may receive vapors during the refueling event, wherein the less loaded canister receives vapors before the more loaded canister. By doing this, a balance in canister loading is achieved.

Turning now to FIG. 7, it shows a plot 700 illustrating an operating sequence during a refueling event based on the methods of FIGS. 4-6 and the system of FIG. 3. Plot 710 illustrates if a refueling event is occurring. Plot 720 illustrates a first canister load and dashed line 722 illustrates a lower threshold load. Plot 730 illustrates a second canister load and dashed line 732 illustrates a lower threshold load, identical to the lower threshold load of dashed line 722. Plot 740 illustrates a VBV position. Plot 750 illustrates a first CVV position. Plot 760 illustrates a second CVV position. Plot 770 illustrates a vapor flow direction. Plot 780 illustrates a FLI and dashed line 782 illustrates a 50% FLI. Time increase from a left to a right side of the figure.

Prior to t1, a refueling event is occurring and FLI increases toward the 50% FLI. At the beginning of the refueling event, the first canister load is greater than the lower threshold load and the second canister load is less than the lower threshold load. As such, the VBV is actuated to the second open position, the first CVV is actuated to the closed position, and the second CVV is actuated to the open position. As such, vapor flows only to the second canister and does not flow to the first canister.

At the t1, the FLI is equal to 50%. As such, the canister loading may be switched from the second canister to the first canister. To do so, the VBV is actuated to the first open position, the first CVV is actuated to the open position, and the second CVV is actuated to the closed position. Between t1 and t2, the FLI increases from 50 to 100% and vapors flow only to the first canister.

At t3, the FLI is equal to 100% and the refueling event is complete. The VBV is actuated to the balance position, the first CVV is maintained in the open position, and the second CVV is actuated to the open position. After t3, the vapor flow balances loads of the first and second canisters. As illustrated, the first canister load decreases and the second canister load increases such that loads thereof are relatively equal.

The technical effect of arranging a three-way VBV valve between load lines of a first canister and a second canister arranged in parallel is to control vapor flow to each canister during a refueling event. The VBV may be further configured to block undesired backflow during a load measurement of either the first canister or the second canister. By doing this, vapor flow to atmosphere during the refueling event may be mitigated and an estimate of a load of the first canister and the second canister may be more accurate.

The disclosure provides support for a method for an evaporative emission control (EVAP) system including determining a load of a first canister and a second canister, flowing vapors to a less loaded of the first canister and the second canister during a refueling event, and switching vapor flow to the other canister in response to a fuel level of a fuel tank during the refueling event. A first example of the method further includes where adjusting a position of a variable bleed valve (VBV) to a first open position when flowing vapors to the first canister or to a second open position when flowing vapors to the second canister during the refueling event. A second example of the method, optionally including the first example, further includes where adjusting the position of the VBV to a closed position outside of the refueling event, wherein the closed position seals a load line from a fuel tank to the first canister and the second canister. A third example of the method, optionally including one or more of the previous examples, further includes where flowing vapors to the first canister comprises adjusting a positon of a first canister vent valve (CVV) to an open position and a position of a second CVV to a closed position, wherein the first CVV controls venting of the first canister to a common vent line and the second CVV controls venting of the second canister to the common vent line. A fourth example of the method, optionally including one or more of the previous examples, further includes where switching vapor flow is executed without monitoring the load of the first canister or the second canister during the refueling event. A fifth example of the method, optionally including one or more of the previous examples, further includes where the load based on a pressure sensed by a fuel tank pressure transducer.

The disclosure further provides support for a system including a fuel system comprising a fuel tank coupled to a first canister and a second canister, a variable bleed valve (VBV) arranged in a load line extending from the fuel tank, a first canister vent valve (CVV) arranged in a first vent line between the first canister and a common vent line, a second (CVV) arranged in a second vent line between the second canister and the common vent line, and a controller with computer-readable instructions stored on non-transitory memory thereof that when executed enable the controller to sequentially load the first canister and the second canister by adjusting the first CVV, the second CVV, and the VBV, wherein adjusting the first CVV, the second CVV, and the VBV is in response to a fuel level in the fuel tank during a refueling event, and loading the first canister and the second canister by coupling the first and second canisters in parallel to the fuel tank. A first example of the system further includes where the fuel level is 50%. A second example of the system, optionally including the first example, further includes where the instructions further enable the controller to determine a load of the first canister and the second canister prior to the refueling event based on feedback from a fuel tank pressure transducer (FTPT). A third example of the system, optionally including one or more of the previous examples, further includes where the load of the first canister is less than the load of the second canister, the instructions enabling the controller to load the first canister prior to loading the second canister, wherein switching from loading the first canister to the second canister occurs without determining the load of the first canister or the second canister. A fourth example of the system, optionally including one or more of the previous examples, further includes where the instructions further enable the controller to balance loads of the first canister and the second canister in response to the refueling event being complete via adjusting the VBV to a closed position and adjusting the first CVV and the second CVV to open positions. A fifth example of the system, optionally including one or more of the previous examples, further includes where the instructions further enable the controller to load a less loaded of the first canister and the second canister at a beginning of the refueling event, and switch to load the other of the first canister and the second canister in response to the fuel level. A sixth example of the system, optionally including one or more of the previous examples, further includes where the fuel level is half of a difference between a fuel level at the beginning of the refueling event and a 100% fuel level. A seventh example of the system, optionally including one or more of the previous examples, further includes where the VBV is a three-way valve. An eighth example of the system, optionally including one or more of the previous examples, further includes where load lines from the fuel tank to the first and second canisters are equal in size and length, purge lines from the first and second canisters to a canister purge valve are equal in size and length, and vent lines from the first and second canisters to the common vent line are equal in size and length.

The disclosure further provides support for a method for an evaporative emission control (EVAP) system including during a first condition, loading canisters coupled in parallel sequentially and during a second condition, loading the canisters coupled in parallel concurrently, the second condition different than the first condition. A first example of the method further includes where the first condition is a refueling event, and wherein the second condition is a non-refueling event. A second example of the method, optionally including the first example, further includes where loading the canisters sequentially comprises loading a less loaded canister during a beginning of the first condition and switching to load the other canister in response to a fuel level of a fuel tank during the first condition, wherein a load of the first canister and the second canister is determined outside of the first condition via a fuel tank pressure transducer (FTPT). A third example of the method, optionally including one or more of the previous examples, further includes balancing the canisters during a third condition different than the first and second conditions, wherein the canisters are fluidly coupled to one another and sealed from a fuel tank. A fourth example of the method, optionally including one or more of the previous examples, further includes where loading the canisters sequentially comprises loading a first canister first during a beginning of the first condition and switching to load a second canister in response to a fuel level of a fuel tank during the first condition, wherein a load of the first canister is equal to a load of the second canister prior to the first condition.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an evaporative emission control (EVAP) system, comprising:
determining a load of a first canister and a second canister;
flowing vapors to a less loaded of the first canister and the second canister during a refueling event; and switching vapor flow to the other canister in response to a fuel level of a fuel tank during the refueling event without monitoring the load of the first canister or the second canister during the refueling event.

2. The method of claim 1, further comprising adjusting a position of a variable bleed valve (VBV) to a first open position when flowing vapors to the first canister or to a second open position when flowing vapors to the second canister during the refueling event.

3. The method of claim 2, further comprising adjusting the position of the VBV to a closed position outside of the refueling event, wherein the closed position seals a load line from a fuel tank to the first canister and the second canister.

4. The method of claim 1, wherein flowing vapors to the first canister comprises adjusting a positon of a first canister vent valve (CVV) to an open position and a position of a second CVV to a closed position, wherein the first CVV controls venting of the first canister to a common vent line and the second CVV controls venting of the second canister to the common vent line.

5. The method of claim 1, wherein the load based on a pressure sensed by a fuel tank pressure transducer.

6. A system, comprising:
 a fuel system comprising a fuel tank coupled to a first canister and a second canister;
 a variable bleed valve (VBV) arranged in a load line extending from the fuel tank;
 a first canister vent valve (CVV) arranged in a first vent line between the first canister and a common vent line;
 a second (CVV) arranged in a second vent line between the second canister and the common vent line; and
 a controller with computer-readable instructions stored on non-transitory memory thereof that when executed enable the controller to:
  sequentially load the first canister and the second canister by adjusting the first CVV, the second CVV, and the VBV, wherein adjusting the first CVV, the second CVV, and the VBV is in response to a fuel level in the fuel tank during a refueling event; and
  loading the first canister and the second canister by coupling the first and second canisters in parallel to the fuel tank.

7. The system of claim 6, wherein the fuel level is 50%.

8. The system of claim 6, wherein the instructions further enable the controller to determine a load of the first canister and the second canister prior to the refueling event based on feedback from a fuel tank pressure transducer (FTPT).

9. The system of claim 8, wherein the load of the first canister is less than the load of the second canister, the instructions enabling the controller to load the first canister prior to loading the second canister, wherein switching from loading the first canister to the second canister occurs without determining the load of the first canister or the second canister.

10. The system of claim 6, wherein the instructions further enable the controller to balance loads of the first canister and the second canister in response to the refueling event being complete via adjusting the VBV to a closed position and adjusting the first CVV and the second CVV to open positions.

11. The system of claim 6, wherein the instructions further enable the controller to load a less loaded of the first canister and the second canister at a beginning of the refueling event, and switch to load the other of the first canister and the second canister in response to the fuel level.

12. The system of claim 11, wherein the fuel level is half of a difference between a fuel level at the beginning of the refueling event and a 100% fuel level.

13. The system of claim 6, wherein the VBV is a three-way valve.

14. The system of claim 6, wherein load lines from the fuel tank to the first and second canisters are equal in size and length, purge lines from the first and second canisters to a canister purge valve are equal in size and length, and vent lines from the first and second canisters to the common vent line are equal in size and length.

15. A method for an evaporative emission control (EVAP) system, comprising:
 during a first condition, loading canisters coupled in parallel sequentially, wherein loading the canisters sequentially comprises loading a less loaded canister during a beginning of the first condition and switching to load the other canister in response to a fuel level of a fuel tank during the first condition, wherein a load of the canisters is determined outside of the first condition via a fuel tank pressure transducer (FTPT); and
 during a second condition, loading the canisters coupled in parallel concurrently, the second condition different than the first condition.

16. The method of claim 15, wherein the first condition is a refueling event, and wherein the second condition is a non-refueling event.

17. The method of claim 15, further comprising balancing the canisters during a third condition different than the first and second conditions, wherein the canisters are fluidly coupled to one another and sealed from a fuel tank.

18. The method of claim 15, wherein loading the canisters sequentially comprises loading a first canister first during a beginning of the first condition and switching to load a second canister in response to the fuel level of the fuel tank during the first condition, wherein a load of the first canister is equal to a load of the second canister prior to the first condition.

* * * * *